United States Patent [19]

Myers

[11] 4,113,054

[45] Sep. 12, 1978

[54] FLUID CONTROL SYSTEM FOR MOBILE AERIAL TOWERS

[75] Inventor: Lester L. Myers, Fort Wayne, Ind.

[73] Assignee: Mobile Aerial Towers, Inc., Fort Wayne, Ind.

[21] Appl. No.: 783,938

[22] Filed: Apr. 1, 1977

[51] Int. Cl.[2] ........................ B66F 11/04; F16D 31/02

[52] U.S. Cl. .......................................... 182/2; 60/421; 60/486

[58] Field of Search ............... 182/2, 141, 63; 60/486, 60/421; 91/414

[56] References Cited

U.S. PATENT DOCUMENTS

| | | | |
|---|---|---|---|
| 3,132,718 | 5/1964 | Pierce | 182/2 |
| 3,910,044 | 10/1975 | Symmank | 60/486 |
| 3,916,767 | 11/1975 | Barton | 60/486 |
| 3,955,474 | 5/1976 | Dunn | 60/421 |
| 3,960,284 | 6/1976 | Carpenter | 60/421 |

*Primary Examiner*—Reinaldo P. Machado
*Attorney, Agent, or Firm*—Gust, Irish, Jeffers & Rickert

[57] ABSTRACT

A fluid control system for a mobile aerial tower which includes a plurality of positioning elements such as first and second interconnected booms and a turntable for rotating the booms about a vertical axis. The control system comprises first and second variable speed pumps and a bank of three double acting valves operatively connected between the pumps and the positioning elements so as to control the direction of fluid flow thereto, and a pneumatically linked remote control system for selectively controlling the speeds at which the pumps operate and for selectively operating the valves to direct fluid between either of the pumps and any one of the positioning elements, or alternatively between both of the pumps respectively and any two of the positioning elements, or alternatively between the pumps collectively and any one of the positioning elements.

34 Claims, 16 Drawing Figures

FLUID CONTROL SYSTEM FOR MOBILE AERIAL TOWERS

BACKGROUND OF THE INVENTION

1. Field of the Invention

The present invention relates to mobile aerial towers and in particular to a fluid control system for selectively operating the various positioning elements such as the upper and lower booms and the turntable.

2. Description of the Prior Art

Mobile aerial towers are well known and generally comprise a truck mounted pedestal on which the tower structure is mounted. The tower structure conventionally comprises a rotatable platform or turntable mounted on the pedestal, an elongated lower boom pivotally mounted on the turntable at one end for swinging movement about a horizontal axis and an upper boom pivotally connected to the other end of the lower boom for swinging movement about a horizontal axis. To the opposite end of the upper boom is pivotally connected a personnel bucket or platform.

Hydraulic motors, often of the double acting piston type, are connected to the upper and lower booms and a suitable hydraulic motor is connected to the turntable to impart rotary motion thereto. In order to permit the tower structure to be positioned by the person carried in the bucket, a remote control unit is mounted therein. Prior art control systems for operating aerial towers of this type are disclosed in L. L. Myers U.S. Pat. Nos. 2,836,467; 2,946,196; 3,133,471 and 3,415,021.

In Myers U.S. Pat. No. 2,946,196 a remote control operator is disclosed wherein a single control lever is connected through suitable mechanical linkage to a plurality of pilot cylinders which in turn are operatively connected to the hydraulic motor control valve through hydraulic lines. As the control lever is moved in a certain direction, one of the pilot cylinders will be actuated thereby pressurizing the hydraulic fluid in its respective line so that one of the motor control valves will be thrown to admit fluid pressure to one side or the other of its respective motor. In this particular instance, a single fluid pump is employed which supplies pressurized hydraulic fluid to each of the motors by individual selectively actuated valves of the type described above.

Due to recent concern over fuel conservation and environmental protection, many mobile aerial tower users, such as utility companies, have turned to electrically operated towers. Typically, battery power is substituted for the gasoline engine and is designed to be charged while the truck is being driven to the work site. When the truck arrives, the engine is shut off and the tower is operated off the battery pack.

One problem with existing battery powered pumps, however, is that they are quite inefficient. When the pump motor is connected to the battery, the pump operates at full speed so that in order to obtain lower speeds, the use of a relief valve is necessary to divert the excess hydraulic pressure. Obviously, operating at only one speed is very undesirable from the standpoint of safety especially when the tower is utilized in work on high voltage power lines. Accordingly, most mobile aerial towers have booms and turntables which are capable of being operated at low, medium and high speeds.

When the tower is being operated at a slower speed, the control valve is moved only a short distance but the pump is still developing its rated pressure. Since only part of the pressure is being utilized, the remainder is passed through a relief valve and an anomalous situation occurs where there is greater battery drain at low speeds than there is at high speed. This is especially true when the bucket is being lowered where only 100 psi or 200 psi of hydraulic pressure out of a system capacity of 1500 psi is necessary because of the effect of gravity. The pump is still operating at full capacity, however, building up full relief pressure with the concomitant drain on the battery.

Of course, if more than one positioning element is being operated simultaneously, a greater percentage of the hydraulic pressure generated by the pump will be utilized. There is a limit to the number of elements which should be operated at one time, however, because of the difficulty in controlling the position of the bucket when rotation about a vertical axis and extension about two horizontal axes are occurring simultaneously. For this reason, it is desirable to limit the number of positioning operations which can occur simultaneously to two. For example, one of the booms and the turntable or, alternatively, the upper and lower booms could be safely operated simultaneously. Another safety problem which may occur is the operation of more than one positioning element at high speed.

SUMMARY OF THE INVENTION

The problems and disadvantages discussed above are overcome by the present invention wherein two electric motor driven hydraulic pumps are provided and selectively connected by means of double acting solenoid valves separately to any two of the positioning elements or simultaneously to any one of them. The pumps are selectively operated at either a low or high speed so that a maximum of any two of the positioning elements may be supplied with hydraulic pressure from the two pumps respectively at a low pressure level or a high pressure level depending upon the individual pump speed. By connecting both pumps simultaneously to any one of the positioning elements and operating both of them at high speed, a third level of hydraulic pressure is available so that the selected positioning element can be operated at a speed twice as high as when only one pump is connected thereto. By varying the hydraulic pressure developed by each pump and the volume of hydraulic fluid being delivered to the various positioning elements, the system provides three speeds for the six movements of the aerial lift. This results in efficient use of battery power and greatly simplifies the hydraulic system.

More specifically, the present invention concerns a fluid control system for a mobile aerial tower having at least three positioning elements which comprises: at least three fluid output lines adapted to be connected respectively to the positioning elements; first and second variable speed pumps; valve means operatively connected between the pumps and fluid lines for controling the direction of fluid flow therethrough; and control means for selectively controlling the speeds at which the pumps operate and for selectively operating the valve means to direct fluid between either the first or second pumps and any one of the fluid lines or alternatively between the first and second pumps, respectively, and any two of the fluid lines or alternatively between the first and second pumps collectively and any one of the fluid lines.

A remote controller mounted in the bucket is provided to enable manual operation of the aforementioned control system. It comprises three double acting pneumatic pistons and cooperating cylinders associated respectively with the fluid lines, three pairs of pneumatic diaphragms connected through air lines to the pistons and cylinders with each pair of diaphragms being connected respectively to opposite sides of its respective piston, resilient means for centering the pistons in the cylinders and for venting opposite sides of the cylinders when the piston is centered, and means operatively connected between the diaphragms and control means for operating same.

It is an object of the present invention to provide a control system for a mobile aerial tower wherein two selectively operated pumps are employed in place of the customary single larger pump thereby reducing battery drain when the various positioning elements are operated at slower speeds.

It is also an object of the present invention to provide a control system for a mobile aerial tower wherein three speeds for each of the six movements are provided by means of a pair of two speed pumps which selectively provide hydraulic pressure to various ones of the positioning elements.

It is a further object of the present invention to provide a control system for a mobile aerial tower wherein the hydraulic system is greatly simplfied.

Another object of the present invention is to provide a fluid control system for mobile aerial towers having a single pneumatic control lever for the three bucket movements wherein incremental advancement thereof in a given direction will cause one of the positioning elements such as the upper or lower boom or the turntable to be operated sequentially at low, medium and fast speeds.

A still further object of the present invention is to provide a fluid control system for a mobile aerial tower having an automatic override which prevents operation of more than two of the positioning elements at one time and limits the maximum speed at which two elements can be operated.

These and other objects and features of the present invention will become more apparent and the invention itself will be best understood by reference to the following description of the preferred embodiment of the invention taken in conjunction with the accompanying drawings.

DESCRIPTION OF THE PREFERRED EMBODIMENT

Figure 15:
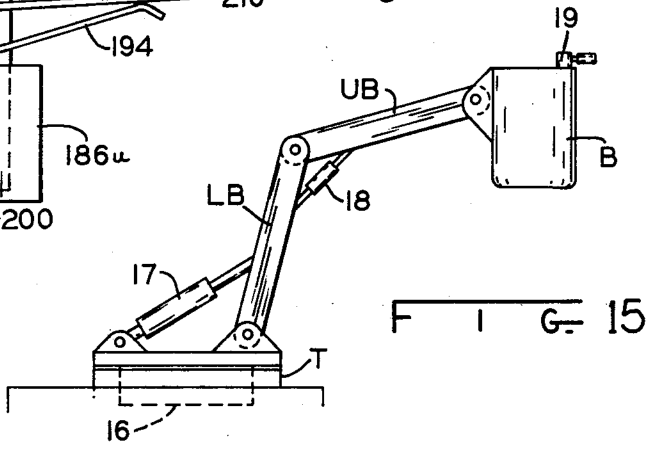
FIG. 15 is a diagrammatic view of a mobile aerial tower showing the personnel bucket, booms and turntable.

A mobile aerial tower generally of the type adapted for the control system for the present invention is shown in FIG. 15. It comprises a turntable T which is rotated by hydraulic motor 16, a lower boom LB generated by double acting hydraulic power cylinder 17, an upper boom UB operated by double acting hydraulic power cylinder 18, and a personnel bucket B.

Referring now in particular to FIGS. 1 through 5, the hand control unit 19 of the present invention will be described. The unit 19 is adapted to be mounted in the bucket of a mobile aerial tower at a location whereby it can be actuated by the workman carried by the bucket. A mobile aerial tower suitable for the practice of the present invention is shown in U.S. Letters Pat. No. 2,836,467, which patent is expressly incorporated by reference into the present application. It comprises a lower assembly 20, a housing 22, a flexible boot 24 secured to housing 22 by means of ring 26, and a cap 28 which is secured to the upper end of boot 24. Lower assembly 20 is secured to housing 22 by means of plate 29 and screw 30.

The upper portion of the control unit 19 is similar in many respects to the unit disclosed in the aforementioned Myers Pat. No. 3,133,471 and includes an operator manipulated handle 32 having a tubular shaft 34 rotatably mounted in cap 28. A collar surrounds the shaft 34 and abuts the front side of cap 28. Slidably received in the hollow portion of shaft 34 is a solid plunger shaft 36 which actuates piston 38 within cylinder 40 as lever 42 is rotated about its pivot 44. Cylinder 40 connects with a safety interlock through fluid line 46 when deadman's lever 42 is released by the operator.

The lower assembly 20 comprises three pneumatic cylinders 48, 50 and 52 having upper end caps 54, 56 and 58 and lower end caps 60, 62 and 64, respectively. Slidably received in each of the cylinders 48, 50 and 52 are pistons 66 having piston rods 68, 130 and 70 corresponding to cylinders 48, 50 and 52, respectively.

The pistons 66 are double acting and the cylinders 48, 50 and 52 accordingly have fluid outlets 72-74, 76-78 and 80-82, respectively, on opposite ends thereof. Seals such as 84, 86, 88 and 90 serve to render cylinders 48, 50 and 52 air tight. Ambient air is admitted to cylinders 48, 50 and 52 to each side of their centered pistons 66 through ports 92, 94 and 96 typically shown in enlarged detail in FIG. 1*a*, protected by shrouds 98, 100 and 102, respectively, and spaced auxiliary ports 92*a* and 92*b* which span seal 86 thereby communicating ambient air via port 92*a* to the chamber above piston 66 and port 92*b* to the chamber below piston 66, small registering undercuts or clearances as shown being provided in piston 66 for this purpose.

Figure 1:
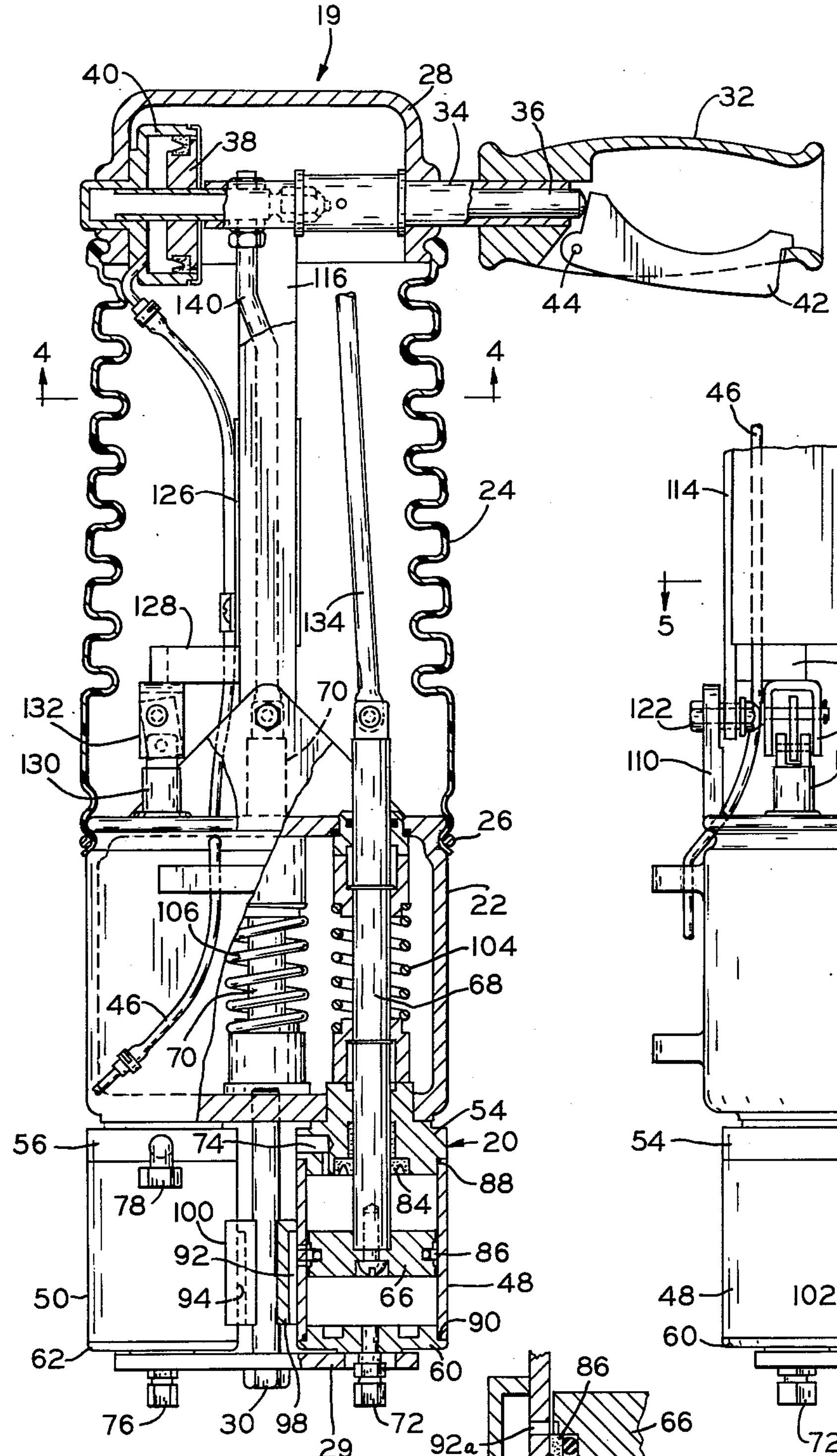
FIG. 1 is a side elevation partially sectioned of the hand control unit forming a portion of the present invention.
Figure 1A:
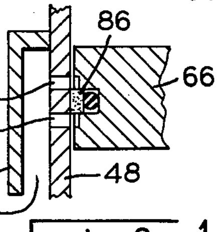
FIG. 1*a* is an enlarged fragmentary view in section of the inlet ports for one of the remote control unit cylinders.
Figure 2:
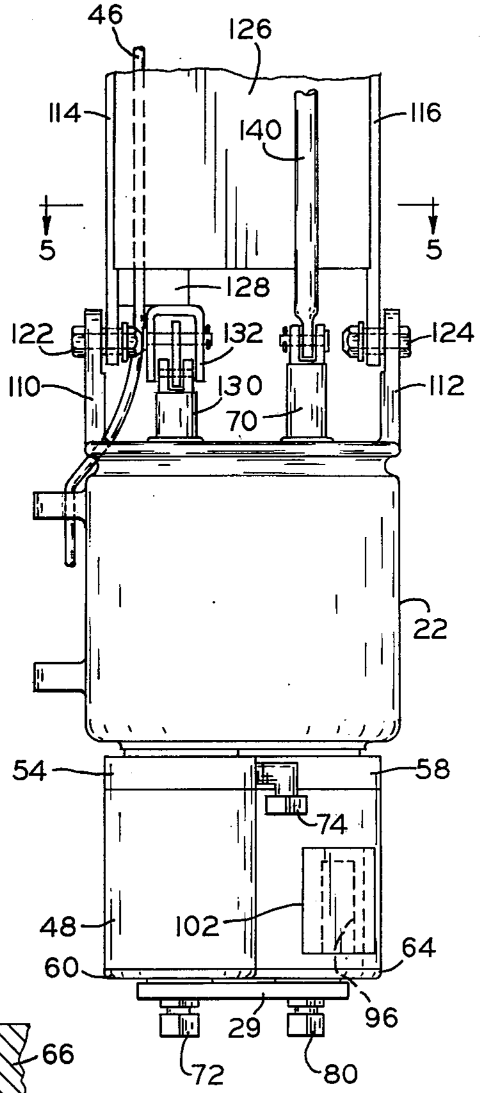
FIG. 2 is a fragmentary front elevation of the unit of FIG. 1 rotated 90° with portions thereof broken away.
Figure 3:
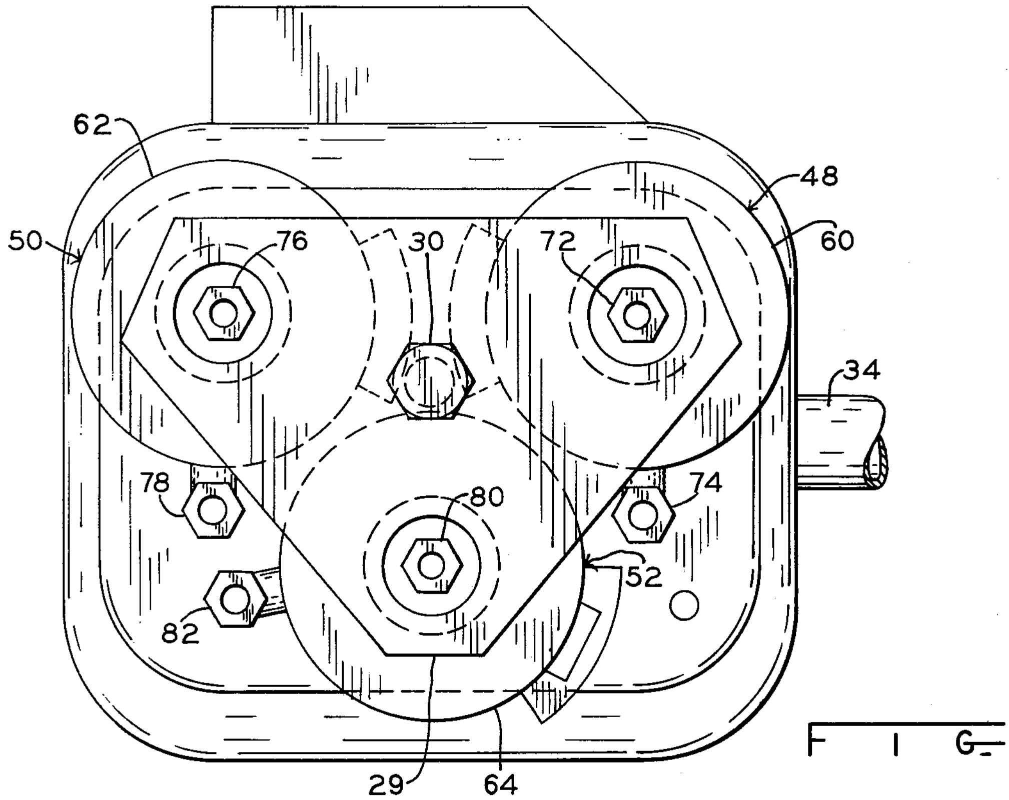
FIG. 3 is a bottom view of the unit of FIG. 1.
Figure 4:
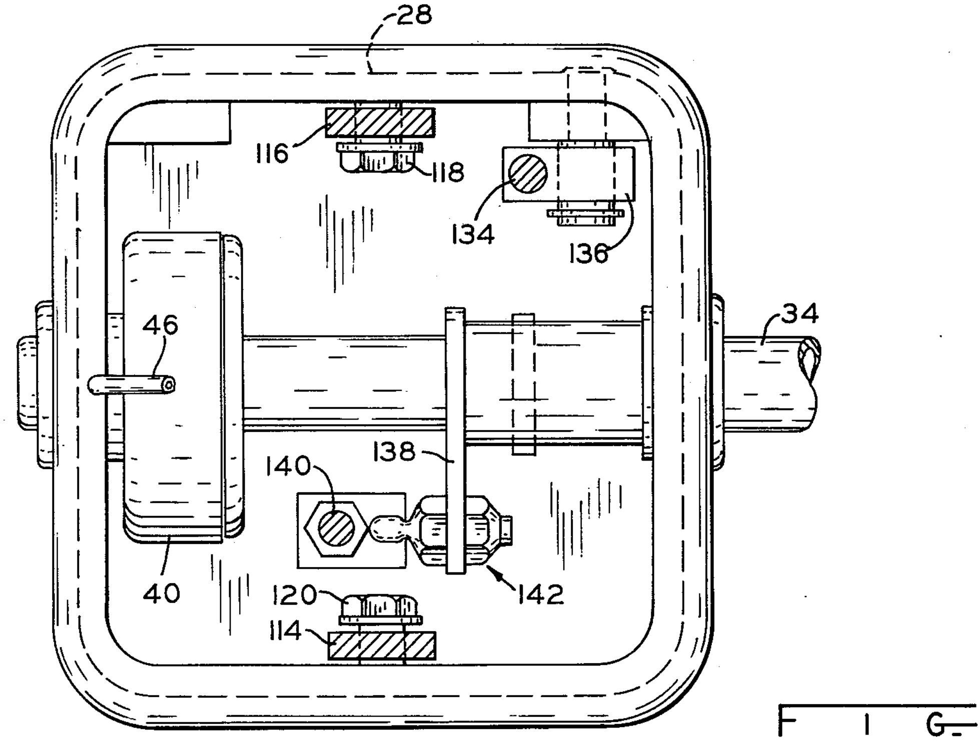
FIG. 4 is a sectional view taken along line 4—4 of FIG. 1. and viewed in the direction of the arrows.
Figure 5:
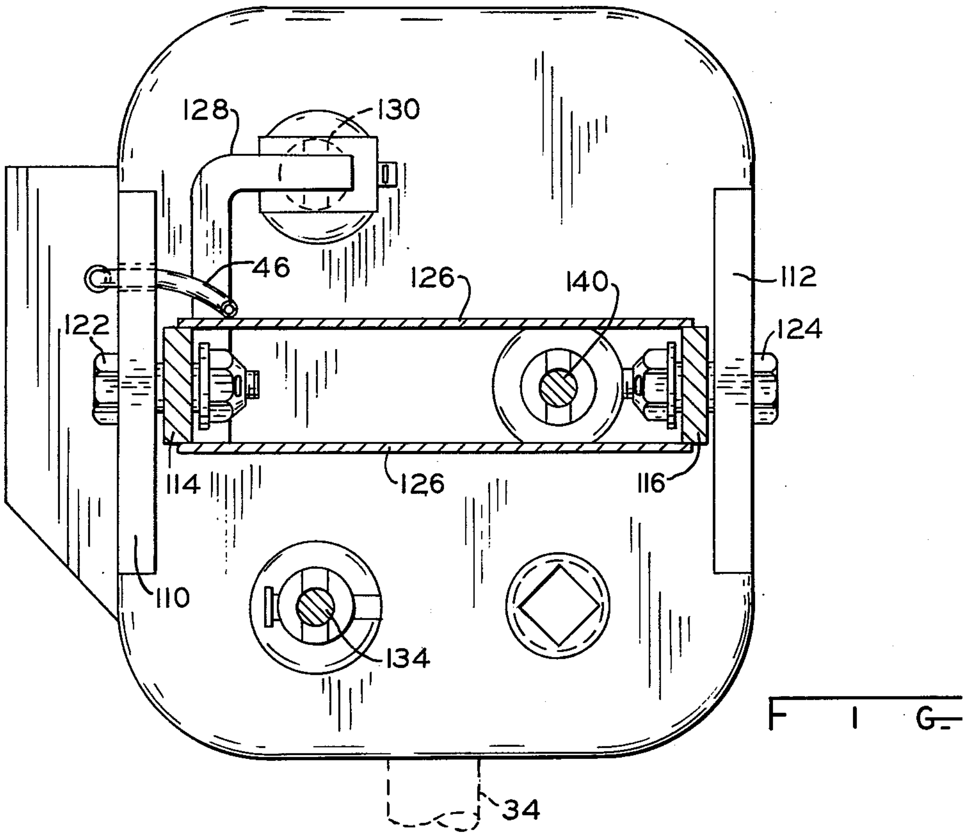
FIG. 5 is a sectional view taken along line 5—5 of FIG. 2 and viewed in the direction of the arrows.

Inlet ports 92, 94 and 96 serve to compensate for expansion and contraction of the air during periods of inactivity by insuring that the air pressure within the cylinders 48, 50 and 52 is always at atmospheric pressure. Springs, such as 104 and 106 always return the pistons 66 to their center position as shown in FIG. 1 when the control unit is released by the operator. As is apparent from the drawings, this opens the inlet ports 92, 94, 96, 92*a* and 94*a* to both sides of the pistons 66. As pistons 66 are reciprocated within their respective cylinders 48, 50 and 52, the respective auxiliary ports 92*a* and 92*b* of ports 92, 94 and 96 are closed by respective seals 86 and the air trapped within the cylinder chamber pressurized. The pneumatic pressure produced by this action will be transmitted to the master control assembly 108 (FIG. 6) by means of separate pneumatic lines connected to outlets 72 through 82.

With regard to the means for selectively actuating each of the three piston and cylinder units, it should be noted that this is similar to the mechanism disclosed in the aforementioned Myers U.S. Pat. Nos. 3,133,471 and 2,946,196, for example. Cap 28 is pivotally mounted to upper housing 22 by means of two upstanding lugs 110 and 112 and two parallel and upstanding lnks 114 and 116 (FIG. 2) which are preferably made of rigid metallic bar stock. The upper ends of links 114 and 116 (FIG. 4) are pivotally secured to opposite sides of cap 28 by means of screws 118 and 120 and are secured at their lower ends to lugs 110 and 112 by means of a second pair of screws 122 and 124.

Two plates 126 are secured to links 114 and 116 so as to cause them to move as a unit. A crossbar 128 is secured at one of its ends to link 114 and the other end pivotally engages the piston rod 130 for cylinder 50 through bracket 132. Thus, when the links 114 and 116 are swung about their pivots 122 and 124, the piston 66 in cylinder 50 will be moved either up or down depending upon the direction of rotation of links 114 and 116. This will result in a corresponding pressurization of the pneumatic line connected to either outlet 76 or 78.

Cylinder assembly 48 includes a rod 134 pivotally connecting between piston rod 68 and cap 28, the latter connection being accomplished through pivotal connector 136. Therefore, as cap 28 is pivoted about connections 118 and 120 (FIG. 4), rod 134 will be raised and lowered correspondingly and its respective piston 66 will reciprocate within cylinder 48.

Handle shaft 34 is rotatably mounted within cap 28 and is rigidly secured to a lever 138 which has its opposite end (FIG. 4) pivotally connected to rod 140 by means of connector 142. Rod 140 in turn is connected to piston rod 70. By partially rotating handle 32 to and fro, and therefore shaft 34, rod 140 will be raised and lowered correspondingly and by virtue of its connection to piston rod 70, the piston in cylinder 52 will reciprocate therein. As was the case with cylinders 48 and 50, this will cause pressurization of one of the pneumatic lines connected to fluid outlets 80 and 82, depending upon the direction of rotation.

The cylinder units 48, 50 and 52 are selectively operated depending on the direction and type of motion which is imparted to cap 28 and handle 32. For example, if it is desired to operate the lower boom, handle 32 will be pushed forward or back so that cap 28 rotates about pivots 122 and 124 (FIG. 2) thereby actuating cylinder 50. To operate the upper boom, cap 28 is tilted about pivots 118 and 120 (FIG. 4) by pulling the handle up or down thereby actuating cylinder 48. To rotate the turntable either clockwise or counterclockwise, handle 32 is rotated partially one way or the other about the axis of shaft 34 so as to actuate cylinder 52. If desired, any two of the cylinders 48, 50 and 52 may be actuated simultaneously so as to provide more complex movement.

Figure 6:
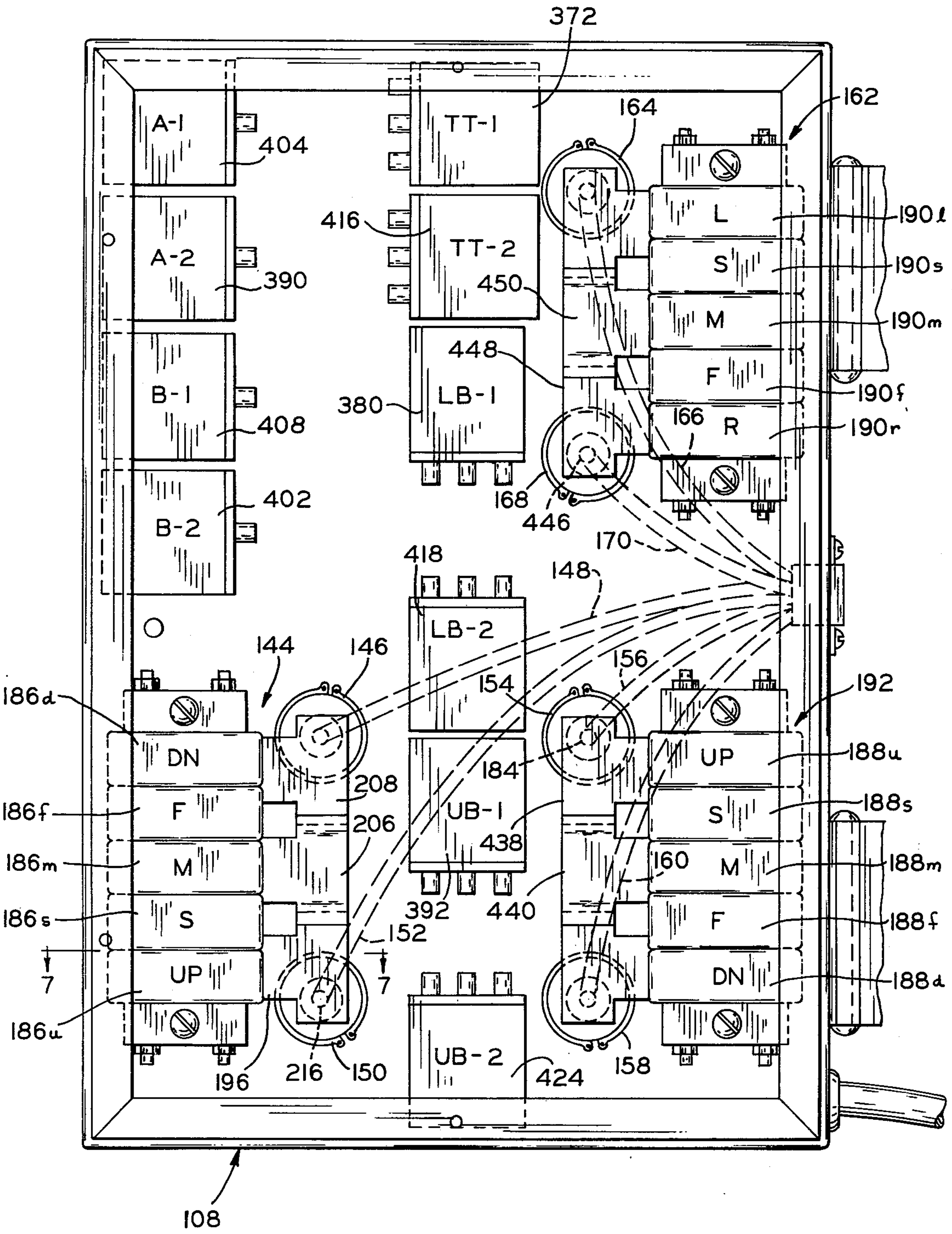
FIG. 6 is a front plan view of the master control box assembly.

Turning now to the master control assembly shown in FIG. 6, the pneumatic lines connecting with the cylinder fluid outlets 72 through 82 are shown together with the slave pneumatic bellows operated thereby. Specifically, the upper boom control mechanism 144 comprises a "down" bellows 146 of the type shown in FIG. 10 which is connected to fluid outlet 72 through pneumtic line 148. A second slave pneumatic bellows 150 actuted to produce upward movement of the upper boom is connected to fluid outlet 74 through pneumatic line 152. With respect to the lower boom, "down" bellows 154 is connected through pneumatic line 156 to fluid outlet 76 and its complementary "up " bellows 158 is connected through pneumatic line 160 to fluid outlet 78. The turntable control mechanism 162 comprises a "left" bellows 164 connected to fluid outlet 82 through line 166, and a "right" bellows 168 which is connected to fluid outlet 80 through pneumatic line 170.

Figure 10:
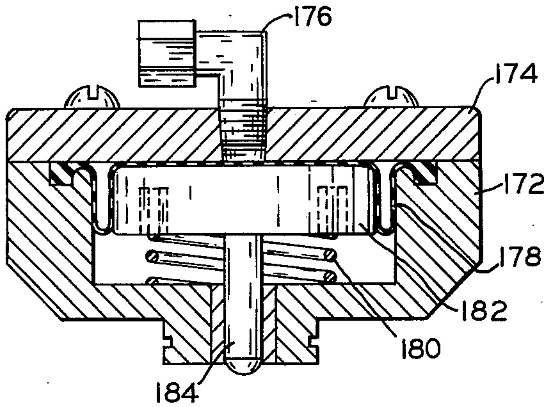
FIG. 10 is a sectional view of one of the bellows shown in FIG. 6.

One of the bellows 146, 150, 154, 158, 164 and 168 is shown in FIG. 10 and comprises a housing 172 having an end cap 174 screwed thereto with an inlet fitting 176 which connects one of the pneumatic lines 148, 152, 156, 160, 166 and 170 to one side of flexible rolling diaphragm 178. A spring 180 maintains diaphragm 178 and piston 182 against end cap 174. If pneumatic pressure is applied through inlet 176, piston 182 and diaphragm 178 will be advanced toward housing 172 by varying distances depending on the quantity of air which is admitted through inlet 176. As piston 182 is moved, it will extend its plunger 184. It should be noted that the bellows assembly shown in FIG. 10 is extremely sensitive so that piston 182 may be incrementally advanced even though the pressure is no greater than a fraction of a psi.

The apparatus is so constructed that by moving the control handle 32 incrementally in the various directions discussed previously, the upper and lower booms and turntable may be actuated at incrementally increasing speeds. For example, if handle 32 is rotated to the right through a first increment, the turntable will rotate clockwise at a slow speed. As the handle 32 is rotated further, the speed will increase to double the initial speed and if the handle 32 is rotated to the right as far as possible, the turntable will rotate at a high speed which is twice that of the second speed. Similar speed control exists for the upper and lower booms as the handle 32 is pushed or pulled either horizontally or verticaly through incremental distances.

Figure 7:
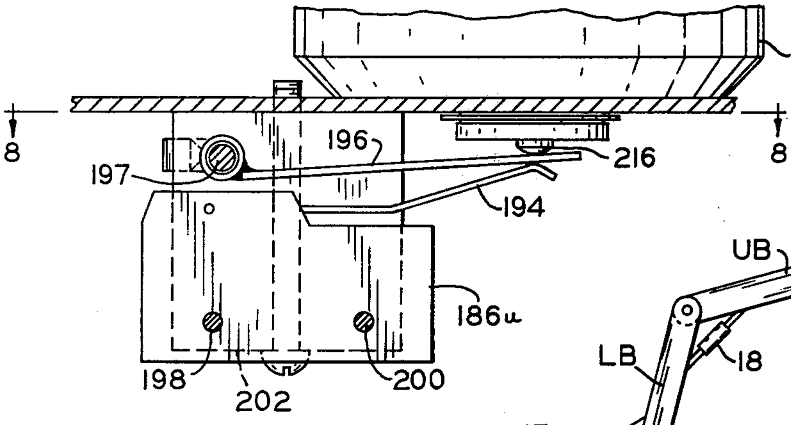
FIG. 7 is a sectional view taken along line 7—7 of FIG. 6 and viewed in the direction of the arrows.
Figure 8:
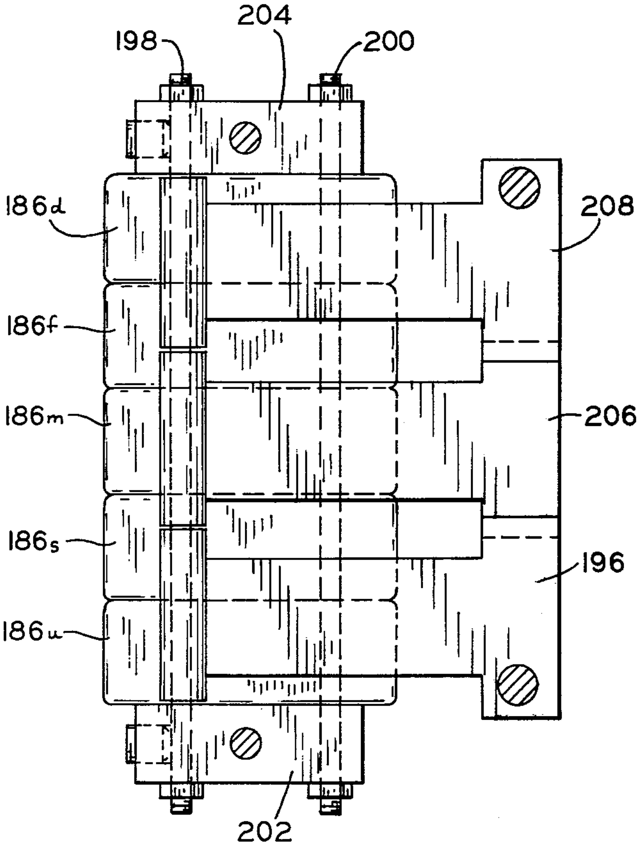
FIG. 8 is a sectional view taken along line 8—8 of FIG.7 and viewed in the direction of the arrows.
Figure 9:
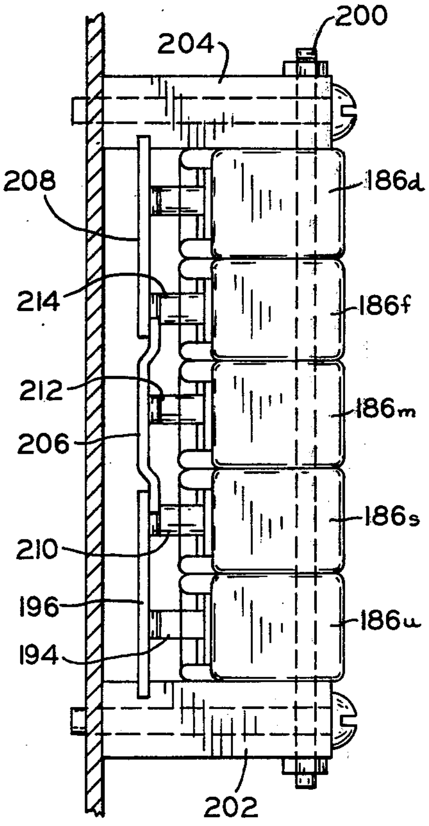
FIG. 9 is a side elevational view partly in section of the microswitch assembly as viewed from the right side of FIG. 8.

Both the direction of movement and the speed at which the movement occurs is controlled by the three banks of microswitches 186, 188 and 190 associated respectively with the upper boom control mechanism 144, the lower boom control mechanism 192 and the turntable control mechanism 162. The details of the mechanical linkage between the various bellows and the microswitch banks 186, 188 and 190 is shown in detail in FIGS. 7, 8 and 9. With respect to microswitch 186*u*, which is the switch which opens the appropriate valves causing the upper boom to be raised, it will be seen that it includes a switch lever 194 which, when depressed, causes microswitch 186*u* to close. It is depressed by means of finger 196 which is hingedly connected to rod 197. The microswitches 186*d*–186*u* are held together by means of rods 198 and 200 and mounting blocks 202 and 204.

In order to obtain sequential closing of microswitches 186*u*, 186*s*, 186*m*, and 186*f*, when desiring to raise the upper boom, three interlocking fingers 196, 206 and 208 are employed. In the case of control mechanism 144, as the piston 66 within cylinder 48 is moved upwardly, finger 196 will be depressed thereby closing microswitch 186*u*. Finger 206 will be depressed by finger 196 and the switch actuators 210, 212 and 214 are set such that microswitches 186*s*, 186*m* and 186*f* will be actuated in sequence as finger 196 is depressed by greater increments. As will be recalled, the plunger 216 of bellows 150 is slaved to the movement of piston 66 in cylinder 48 so that as handle 32 is pulled upwardly, microswitches 186*u*–186*f* will be actuated in sequence.

If it is desired to lower the upper boom, handle 32 is pushed downwardly and bellows 146 will be actuated, again with its movement being slaved to the movement of piston 66 in cylinder 48. This will cause finger 208 to be depressed thereby closing microswitch 186*d* and finger 206, which engages switch actuators 210, 212 and 214 which act to sequentially close microswitches 186*s*, 186*m* and 186*f*. Control mechanisms 162 and 192 are identical to mechanism 144 and function to operate the turntable and lower boom in the same fashion.

Figure 11:
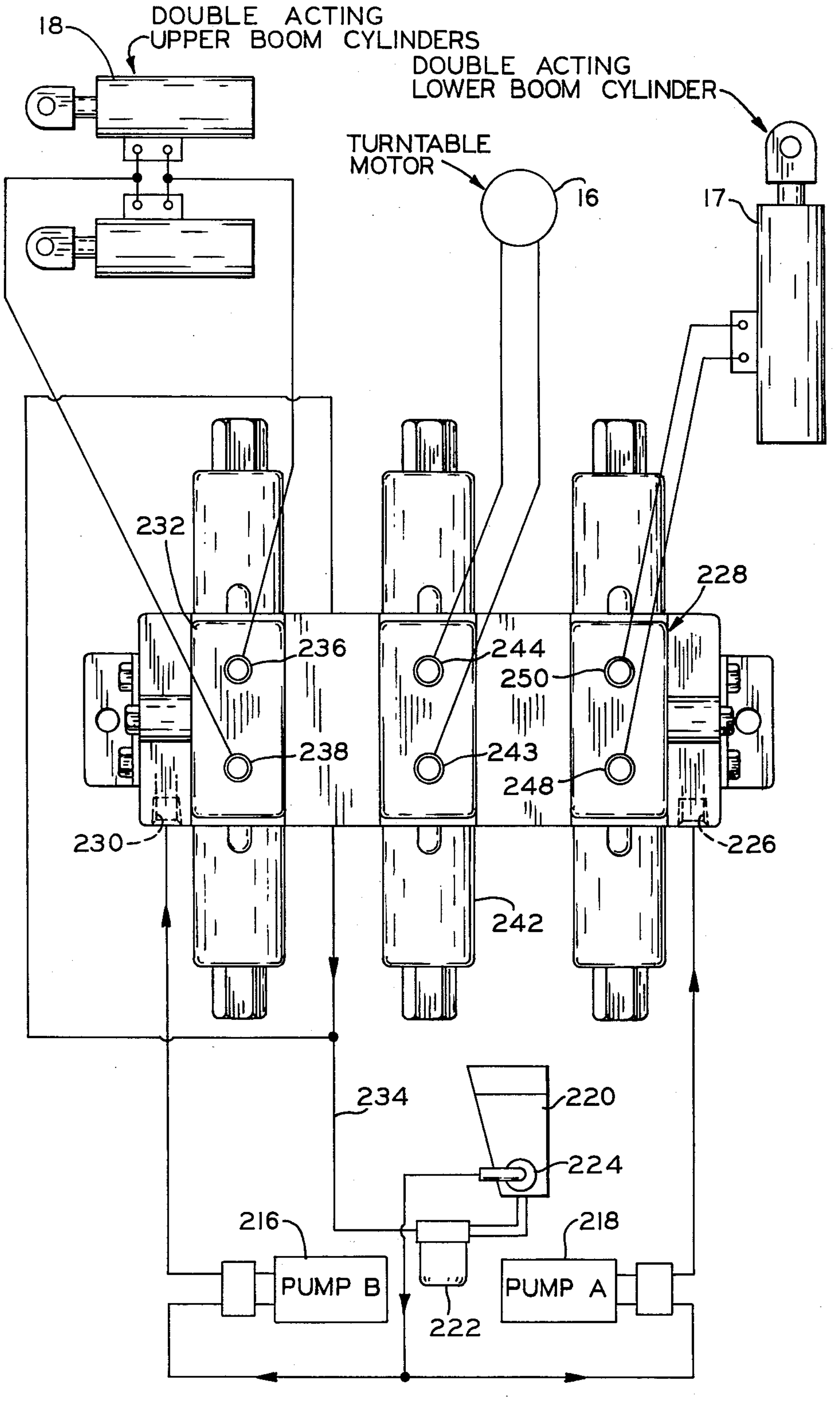
FIG. 11 is a partially schematic view of the hydraulic system of the present invention.
Figure 12:
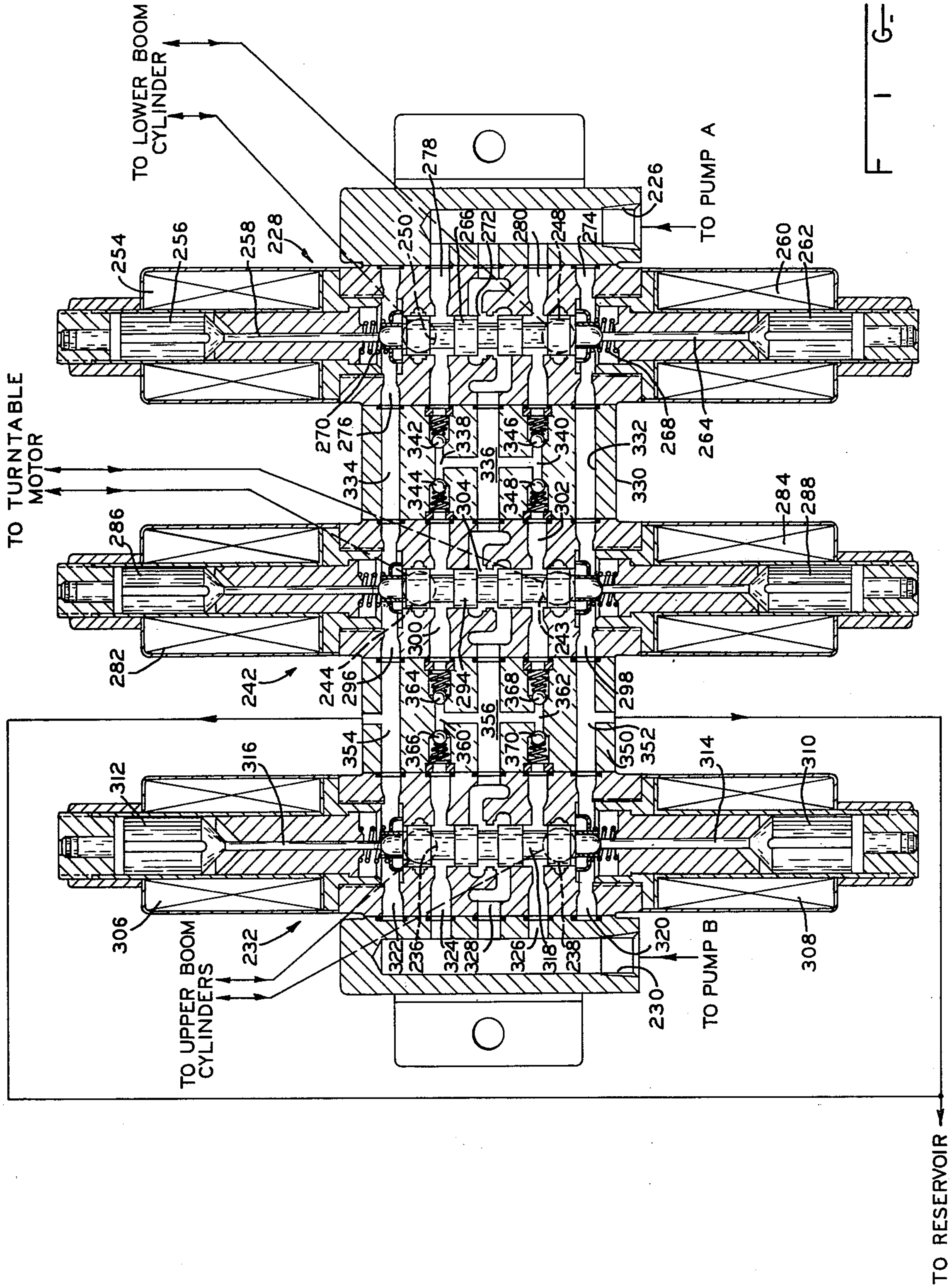
FIG. 12 is a sectional view of the valve assembly shown in FIG. 11.

Referring now to FIGS. 11 and 12, the hydraulic system of the present invention will be described. A pair of two speed DC pumps 216 and 218 are provided and connect with a reservoir 220 including a filter 222 and suction strainer 224. Pump 218 connects with the inlet 226 of valve 228 and pump 216 connects with the inlet 230 of valve 232. Return from valves 228, 232 and 242 to reservoir 220 is provided through line 234.

Valve 232 has a pair of outlets 236 and 238 which respectively are connected to upper boom cylinders 18 for selectively lowering and raising the upper boom UB, center valve 242 includes a pair of hydraulic outlets 243 and 244 which admit pressurized fluid via the indicated lines to turntable motor 16 thereby rotating it clockwise and counterclockwise, respectively, as desired, and valve 228 has fluid outlets 248 and 250 connected to lower boom cylinder 17 for operating the lower boom LB. The upper and lower boom cylinders are conventional and double acting.

The valve bank illustrated in FIG. 12 comprises three conventional series parallel type 4-way spool valves, such as the FPS Mini-Pak valve series manufactured by Fluid Power Systems, a division of AMBAC Industries, Inc., described in their bulletin No. 1004-D, which are stacked in a manner which permits either pump 216 or 218 to pump fluid to the various positioning elements through either pair of valve outlets 236, 238 or 243, 244 or 248, 250.

The valves are solenoid operated and valve 228 includes a first coil 254 which actuates armature 256 and its operating rod 258 in a downward direction, and a second coil 260 which shifts armature 262 and its rod 264 upward. When rod 258 is actuated, it pushes valve body 266 downwardly against the resistance of spring 268 and when rod 264 is operated, it pushes valve body 266 upwardly against spring 270. Obviously, when neither coil 254 nor 260 is activated, springs 268 and 270 will maintain valve body 266 centered in the position shown in FIG. 12. It should be noted that although the directions "up" and "down" have been used, this merely refers to the manner in which they are oriented in FIG. 12 and the valve assembly will function identically regardless of the actual physical orientation.

When valve body 266 is in the rest or centered position, series port 272, return ports 274 and 276 and parallel ports 278 and 280 will be open whereas outlet ports 248 and 250 will be closed. If the valve spool 266 is shifted upwardly by the energization of coil 260, series port 272 will be closed, outlet port 250 will be open to parallel port 278 and therefore pump 218 and outlet port 248 will open to return port 274. If the valve spool 266 is shifted downwardly by the energization of coil 254, series port 272 will be closed, outlet port 250 will be open to return port 276 and outlet port 248 will be open to parallel port 280. It should be noted that parallel ports 278 and 280 as well as series port 272 are always open to inlet 226.

Turning now to turntable valve 242, it comprises first and second solenoid coils 282 and 284 which actuate armatures 286 and 288 and their respective connecting rods 290 and 292, respectively, to shift valve body 294 down and up. Similarly to valve 228, valve 242 includes return ports 296 and 298, parallel ports 300 and 302 and series port 304. Valve 242 functions identically to valve 228.

Valve 232 is also identical to valve 228 and comprises first and second coils 306 and 308 having armatures 310 and 312 and connecting rods 314 and 316, respectively, which serve to shift valve body 318 down and up. It includes return ports 320 and 322, parallel ports 324 and 326 and series port 328.

Positioned between valves 228 and 242 is a specially ported spacer block 330 which includes a return port 332 connecting with return ports 274 and 298, a second return port 334 connecting with return ports 276 and 296, a series port 336 connecting with series ports 304 and 272 and a pair of parallel ports 338 and 340. Parallel port 338 connects with port 278 through check valve 342 and with parallel port 300 through check valve 344. Similarly, parallel port 340 connects with port 280 through check valve 346 and with parallel port 302 through check valve 348. A second spacer block 350 is positioned between valves 232 and 242 and comprises a first return port 352 connecting with ports 320 and 298, a second return port 354 connecting with ports 332 and 296, a series port 356 connecting with ports 304 and 328, and a pair of parallel ports 360 and 362. Parallel port 360 connects with port 300 through check valve 364 and with parallel port 324 through check valve 366. Similarly, parallel port 362 connects with port 302 through check valve 368 and with parallel port 326 through check valve 370.

When the hydraulic system is deenergized, each of the valve bodies 266, 294 and 318 will be in the positions shown and neither pump 216 nor pump 218 will be energized. If it is desired to admit fluid from pump 218 through outlet 250 in order to retract the lower boom cylinder 17, coil 260 will be energized thereby shifting valve body 266 upwardly. Pump 218 will be energized and pressurized hydraulic fluid will flow through inlet 226, parallel port 278 and then through outlet 250 to lower boom cylinder 17. The return fluid from lower boom cyinder 17 will flow in through outlet 248, through return ports 274, 332, 298 and 352 into return line 234 through which it will flow to reservoir 220.

If valve 228 is deenergized and valve 242 subsequently energized, fluid from pump A will reach its parallel ports 300 and 302 by flowing through inlet 226, series ports 272 and 336, through parallel ports 338 and 340 past check valves 344 and 348. From parallel ports 300 and 302, it will flow out through whichever outlet 244 or 243 is open. Fluid from pump 216 is capable of reaching valve 242 in a similar fashion. In the event that one of the outer valves 228 or 232 has been energized, its series port 328 and 272, respectively, will be blocked so that only fluid from the respective other pump can reach the center valve 242. If both of the outside valves 228 and 232 are activated, center valve 242 will be isolated from both pumps 216 and 218. If both pumps 216 and 218 are energized and only one of the valves 228, 242 or 232 is activated, the activated valve will receive twice the hydraulic pressure either directly through its parallel ports or indirectly through the aligned series ports and appropriate check valves.

Figure 14:
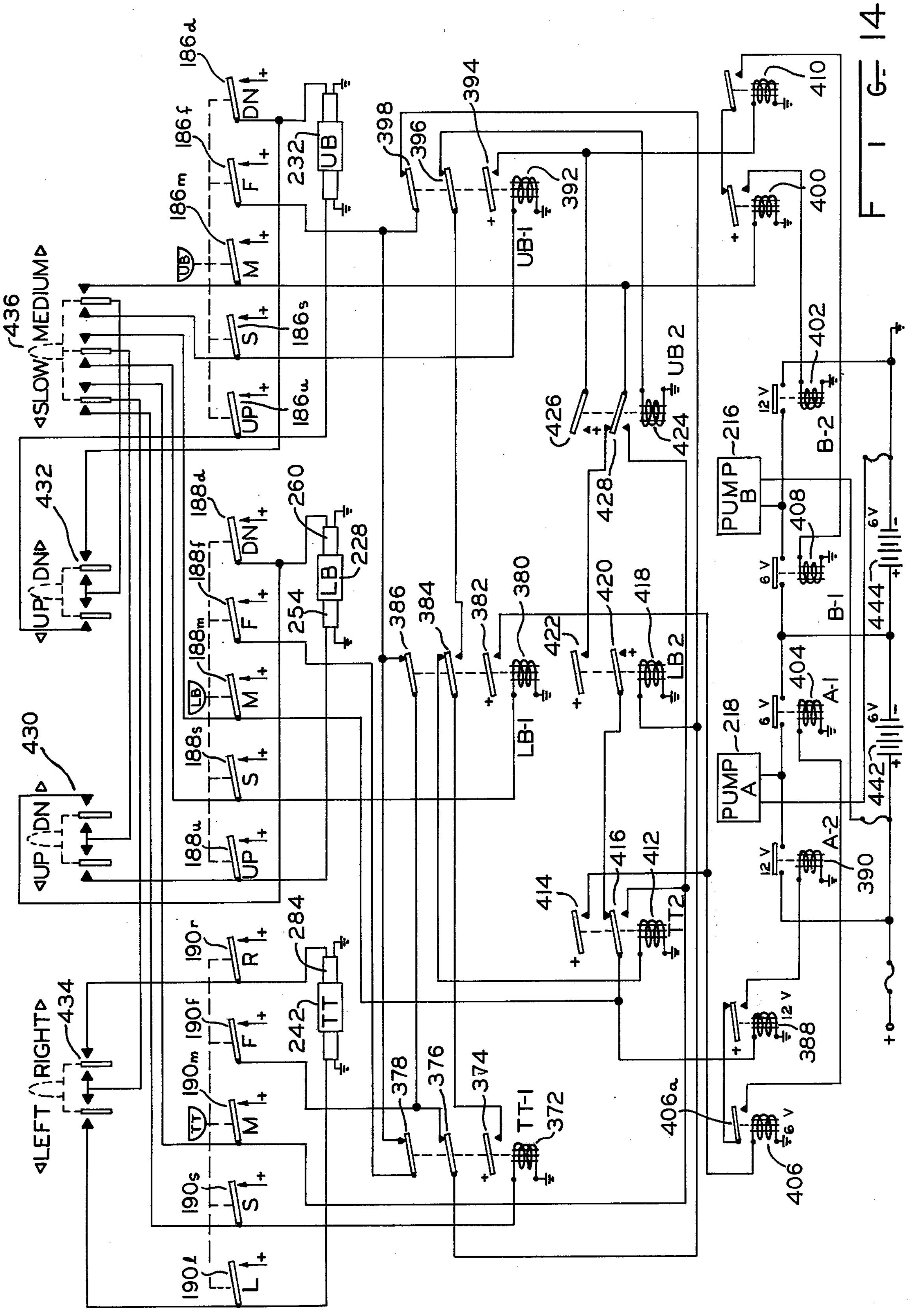
FIG. 14 is a schematic diagram of the electrical circuit according to the present invention.

Referring now to FIG. 14, the electrical schematic will be described. The various microswitch banks 186, 188 and 190 and the four way spool valves 232, 228 and 242 as well as pumps 216 and 218 correspond to those previously described.

When microswitches 190$^1$ or 190*r* are closed, a positive voltage is applied to turntable valve 242 so as to actuate it in either the "up" or "down" position. When microswitch 190*s* is closed, solenoid 372 will be energized thereby closing switch 374 and opening switches 376 and 378. When microswitch 188*s* is closed, solenoid 380 will be energized thereby closing switch 382, throwing double-throw switch 384 and opening switch 386. When microswitch 188*m* is closed, a positive voltage will be applied to solenoid 388 and when it closes, solenoid 390 will be energized. When microswitch 186*s* is closed, solenoid 392 will be energized thereby closing switch 394 and opening switches 396 and 398. The closing of microswitch 186*m* will energize solenoid 400 which in turn energizes solenoid 402.

Solenoid 404 is operatively connected to the contacts of solenoid 406, and solenoid 408 is operatively connected to the contacts of solenoid 410. Solenoids 404 and 390 respectively close contacts which connect a voltage source of 6 volts and 12 volts to pump 218 and solenoids 408 and 402 include contacts which connect a voltage of 6 volts and 12 volts, respectively, to pump 216. Since pumps 216 and 218 are DC pumps, by doubling the voltage, the output in terms of hydraulic pressure will also be doubled.

Solenoid 412, which is operatively connected to switch 384, closes switch 414 and changes poles on double pole switch 416 when energized. Solenoid 418, which is operatively connected to switches 376 and 398, closes switches 420 and 422 when actuated. Solenoid 424, which is operatively connected to switch 396, closes switch 426 and changes poles on double pole switch 428 when energized. At all places where the symbol "+" appears, this indicates a positive voltage terminal.

In addition to the remotely actuated microswitches 186, 188 and 190, valves 228, 232 and 242 may be actuated by manual switches 430, 432 and 434. Speed switch 436 is operative to shunt the "slow" and "medium" microswitches 190*s*, 190*m*, 188*s*, 188*m*, 186*s* and 186*m*. Switches 430, 432, 434 and 436 are located on the control box mounted on the truck so that the bucket may be operated from the ground if desired.

The operation of the control system will be explained by describing the sequence of operations which occurs when various movements are called for by operating the remote control unit.

If it is desired to raise the lower boom LB, the control handle 32 will be gripped and then pulled so as to tilt links 114 and 116 about pivots 122 and 124. This causes cross-bar 128 to raise piston rod 130 and applies pneumatic pressure to bellows 154 through pneumatic line 156. Assuming that handle 32 is pulled only through the first increment of available movement, approximately the same quantity of air which is displaced by the piston 66 in cylinder 50 will be admitted to the inlet side of the diaphragm 178 (FIG. 10) in bellows 154 and will therefore cause plunger 184 to be extended just enough to raise finger 438 (FIG. 6) and close only microswitch 188*u* (FIGS. 6 and 14).

With reference to FIG. 14, the closing of microswitch 188*u* energizes coil 254 so as to shift valve body 266 downwardly. This opens fluid outlet 248 (FIG. 12) to parallel port 280 and opens outlet 250 to return port 276. Since neither of the pumps 216 nor 218 have yet been energized, no fluid flow will occur.

As handle 32 is pulled through the second increment, a second quantum of pressurized air will be produced by the further raising of piston 66 and cylinder 50 which is supplied to the inlet side of diaphragm 178 thereby causing plunger 184 to extend a further distance out of housing 172 and against finger 438. Since finger 438 is in contact with finger 440 (FIG. 6), the movement of plunger 184 will be transmitted thereto and it will be raised a short distance sufficient to close microswitch 188*s*.

When microswitch 188*s* closes, solenoid 380 will be energized thereby closing switch 382, changing poles on switch 384 and opening switch 386. The closing of switch 382 energizes solenoid 406 which in turn applies positive voltage to solenoid 404 via switch 406*a*. When the contacts of solenoid 404 close, 6 volts will be applied to the input of the DC motor driving pump 218. The hydraulic pressure developed thereby will be applied to the lower boom cylinder 17 through inlet 226, parallel port 280 and fluid outlet 248. Return fluid from lower boom cylinder 17 will flow through fluid outlet 250 into return ports 276, 334, 296 and 354 and then through line 234 to reservoir 222.

If it is desired to raise the lower boom LB at a greater speed, handle 32 is pulled further to the right through the third increment thereby applying a third quantum of pressurized air to bellows 154 which, through the mechanical linkage of plunger 184, and fingers 438 and 440, closes microswitch 188*m*. When switch 188*m* closes, solenoid 388 is energized thereby applying the positive voltage on its contact to solenoid 390 which connects 12 volts to pump 218 from batteries 442 and 444. It will be noted that when solenoid 388 is energized, the positive voltage is removed from solenoid 404 so that the 6 volt switch will open. Since the input voltage to the pump DC motor has been doubled, the hydraulic pressure produced thereby will also be doubled.

In order to extend the lower boom cylinder 17 at the fastest rate, handle 32 is pulled to the right the full distance thereby applying a fourth quantum of air under pressure to bellows 174 which results in the closing of microswitch 188*f* by finger 440. Referring to FIG. 14, when microswitch 188*f* closes, solenoid 418 will be energized via switches 378 and 398 thereby closing switch 422 which will apply a positive voltage to solenoid 400 via switch 428 which in turn applies a positive voltage to 12 volt solenoid 402. This applies 12 volts to activate pump 216 to develop maximum hydraulic output simultaneously with pump 218.

With pump 216 energized, hydraulic fluid will flow through inlet 230 through series ports 328, 356, 304 and 336 and from there through parallel port 340 past check valve 346 into parallel port 280 and fluid outlet 248. The doubling of hydraulic pressure within lower boom cylinder 17 will cause it to be extended at a faster rate.

If it is desired to rotate the turntable T clockwise while continuing to raise the lower boom LB, handle 32 will be turned clockwise about its axis while at the same time pulling it rearwardly. Assuming that handle 32 is rotated through the first two increments so as to cause rotation of the turntable motor 16 at the low speed, rod 140 and piston rod 170 will be depressed through two increments so as to deliver two quantums of air under pressure to bellows 168 thereby causing plunger 446 (FIG. 6) to be raised through two incremental distances and by means of interlocked fingers 448 and 450, microswitches 190*r* and 190*s* will be closed.

With reference to FIG. 14, the closing of microswitch 190*r* will energize valve 242 and the closing of microswitch 190*s* will energize solenoid 372 which opens switches 376 and 378 and closes switch 374. When switch 378 opens, solenoid 418 will be deenergized which in turn will deenergize solenoids 400 and 402 so that the 12 volt input is removed from pump 216. The closing of switch 374, however, will energize solenoid 424 via switches 384 and 396 which energizes solenoid 410 via switch 426 so as to place a positive voltage on solenoid 408 thereby closing the 6 volt contacts for pump 216. This causes pump 216 to operate at the slower speed and develop one-half the hydraulic pressure as previously. At this point, pump 218 is developing full hydraulic pressure due to the closing of microswitches 188*u*, 188*s*, 188*m* and 188*f*.

The closing of microswitch 190*r* energizes coil 284 so as to shift valve body 294 upwardly. This closes series port 304 and the low pressure hydraulic fluid flowing into series port 356 from inlet 230 and series port 328 is diverted to fluid outlet 244 via port 360, check valve 364 and parallel port 300. Fluid return from turntable motor 16 enters through fluid outlet 243 and from there flows through return ports 298 and 352 into return line 234. It will be noted that when a second control is actuated, maximum hydraulic pressure is diverted from the previously operating element so that it will drop down to medium speed. If it is desired to operate the turntable motor 16 also at medium speed, handle 32 will be rotated further to the right thereby causing pump 216 to develop maximum hydraulic pressure through the action of the solenoid circuit shown in FIG. 14.

If it is desired to simultaneously operate the upper boom cylinders 18, the shifting of valve body 318 will close series port 328 so that the turntable motor 16 will be deenergized. The system therefore includes a safety override which prevents more than two of the elements from being operated simultaneously.

If the control handle 32 is released, the springs such as 106 will automatically center their respective pistons 66 and the bellows 168 and 154 will return to their normal positions under the action of springs 180. This results in all of the microswitches 186, 188 and 190 opening thereby deenergizing pumps 216 and 218 and permitting valves 228, 242 and 232 to assume their unenergized center positions. By tracing the hydraulic and electric circuits through for various operations, it will be seen that many combinations of movements are possible by moving control handle in one of the six possible directions. The speed at which each movement occurs is controlled by the distance through which handle 32 is pushed, pulled or turned.

If desired, a hydraulic remote control unit or one utilizing non-conductive Bowden cables may be employed in place of the pneumatic unit described above.

Figure 13:
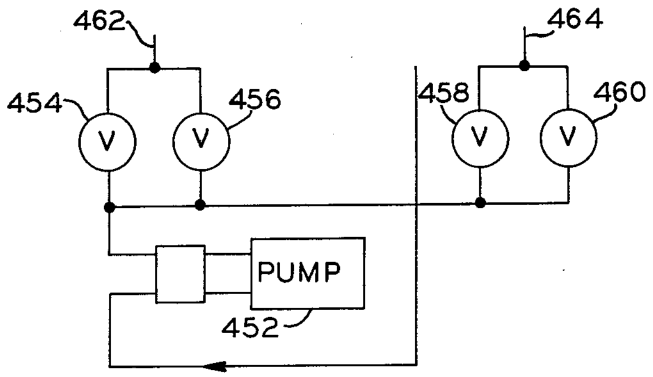
FIG. 13 is a schematic showing of a modification to the hydraulic system shown in FIG. 11.

A modification to the system described above is illustrated in FIG. 13 and comprises a single pump 452 and four independently controlled metering type solenoid valves 454, 456, 458 and 460. Valves 454 and 456 are connected in parallel to a single output line 462 which would be connected to valve inlet 230. Similarly, valves 458 and 460 are connected in parallel to a single line 464 which would connect with valve inlet 226. By controlling the valves 454–460 which are open, three speeds may be provided from a single constant speed pump 452. In this case, valves 454, 456, 458 and 460 would be opened and closed by means of solenoids 408, 402, 404 and 390, respectively.

While there have been described above the principles of this invention in connection with specific apparatus, it is to be clearly understood that this description is made only by way of example and not as a limitation to the scope of the invention.

What is claimed is:

1. A mobile aerial tower comprising:

a personnel bucket, a plurality of fluid operated positioning elements including first and second interconnected boom means one of which is connected to said bucket for positioning the same and turntable means connected to at least one of said boom means for rotating said boom means about an upright axis, first and second variable speed pumps, and selectively actuatable valve means for operatively connecting said first and second pumps respectively simultaneously to any two of said positioning elements or alternatively operatively connecting said first and second pumps simultaneously to any one of said positioning elements or alternatively operatively connecting either said first or second pump to any one of said positioning elements.

2. The apparatus of claim 1 wherein said valve means comprises:

three electrically operated valves having outlets in fluid communication respectively with said first boom means, said second boom means and said turntable means, and inlets which are in fluid communication respectively with said outlets when the respective said valve is open, and means for selectively operatively connecting either or both of said pumps to the inlet of any of said valves.

3. The apparatus of claim 2 wherein said pumps are selectively variable to either a high speed or a low speed.

4. The apparatus of claim 2 wherein said valve means includes means whereby when two of said valves are open, neither of said pumps is in fluid communication with more than one said valve inlet.

5. The apparatus of claim 2 wherein said valve means further comprises means whereby simultaneous connection of all of said valve inlets to said pumps is prevented.

6. The apparatus of claim 1 wherein said pumps each are selectively operable at a high speed and a low speed, and including manually operable selector switch means associated with one of said positioning elements operatively connected to said pumps and having first, second and third speed positions for operating one of said pumps at its said low speed and operatively connecting said last mentioned pump to said one of said positioning elements when said switch means is in its said first position, and operating both said pumps at their said high speed and operatively connecting said pumps to said one of said positioning means when said switch means is in its said third position.

7. The apparatus of claim 6 wherein said switch means includes means for operating one of said pumps at its said high speed and operatively connecting said last mentioned pump to said one of said positioning elements when said switch means is in said second position.

8. The apparatus of claim 7 and including second and third said switch means associated respectively with the other of said positioning elements and connected to said pumps.

9. The apparatus of claim 8 wherein each said selector switch means each is operable sequentially through said first, second and third speed positions.

10. The apparatus of claim 1 and including a remote controller comprising:

three double acting, manually operated pneumatic master piston and cylinder means, at least three pneumatic slave piston and cylinder means operatively connected respectively over air lines to said master piston and cylinder means, and means for operatively connecting said slave piston and cylinder means to said pumps and said valve for controlling the same.

11. The apparatus of claim 10 wherein said pumps and said valve means are electrically operated and said means for operatively connecting said slave piston and cylinder means comprises: a plurality of electric switch means for controlling said pumps and said valve means, and means linked to said slave means for sequentially actuating said switch means as said slave piston and cylinder means is incrementally actuated.

12. A fluid control system for a mobile aerial tower having at least three movable positioning elements, said control system comprising:

fluid output lines adapted to be connected respectively to the positioning elements, first and second variable speed pumps, valve means operatively connected between said pumps and said fluid lines for controlling the direction of fluid flow through said lines, and control means for selectively controlling the speed at which said pumps operate and for selectively operating said valve means to direct fluid between either said first or second pump and any one of said fluid lines or alternatively between said first and second pumps respectively and any two of said fluid lines or alternatively between said first and second pumps collectively; and any one of said fluid lines.

13. The control system of claim 12 wherein:

said pumps are electrically operated, said valve means comprises three electrically operated valves connected respectively to said fluid lines, and said control means comprises three manually actuated switch means associated respectively with said fluid lines each having a first and second position for operating one of said pumps at a low speed and actuating its respective said valve to direct fluid between said one of said pumps and its respective said fluid line when in its said first position and for operating said one of said pumps at a higher speed and similarly directing fluid between said one of said pumps and its said respective fluid line when in its said second position.

14. The control system of claim 13 wherein each said switch means has a third position and includes: means for operating both said pumps at said higher speed and directing fluid simultaneously between said pumps and its said respective fluid line when in its said third position, and means for rendering said switch means third position inoperative when any other of said switch means is actuated.

15. The control system of claim 14 wherein said switch means are each constrained to be sequentially actuated through said first, second and third positions.

16. The control system of claim 14 and including a remote controller comprising a manually actuated master control and slave means actuated by said master control for each said switch means, said slave means comprising means for sequentially operating its respective said switch means through its said first, second and third positions as said master control is actuated.

17. The control system of claim 16 wherein said slave means includes a fluid actuated plunger.

18. The control system of claim 17 wherein said switch means comprises a plurality of mechanically actuated switches and said slave means includes fingers positioned to actuate said switches, said fingers being operated by said plunger.

19. The control system of claim 16 wherein said electrically operated valves are reversible, said master controls comprise double acting piston and cylinders, said slave means each comprises a pair of fluid actuated plungers, and said switch means includes means operated by said slave means for reversing said valves.

20. The apparatus of claim 19 wherein said switch means comprises a plurality of mechanically operated switches and said slave means includes fingers positioned to actuate said switches, said fingers being actuated sequentially by their respective said plungers.

21. The control system of claim 19 wherein said double acting piston and cylinders are pneumatic and said plungers are operated by means of pneumatic diaphragms.

22. The control system of claim 12 and including a remote controller comprising:

at least three double acting pneumatic pistons and cooperating cylinders associated respectively with said fluid lines, three pairs of pneumatic diaphragms connected respectively through air lines to said pistons and cylinders, each pair of diaphragms being connected respectively to opposite sides of their respective said piston and cylinder, resilient means for centering said piston in said cylinders and for venting said opposite sides of said pistons when said cylinder is centered, and means operatively connected between said diaphragms and said control means for operating the latter.

23. The control system of claim 12 wherein said valve means comprises:

first, second and third double acting valves each having a pair of fluid outlets respectively connected to said three positioning elements, first fluid inlet means for supplying fluid from said first pump to said first valve, and second fluid inlet means for supplying fluid from said second pump to said second valve, and third fluid inlet means for supplying fluid to said third valve, said first and second valves including means for selectively diverting fluid from said first and second pumps, respectively, to said third inlet means.

24. The control system of claim 23 and wherein said first valve includes means for blocking fluid from said first pump to said third inlet means when said first valve is operated, and said second valve includes means for blocking fluid from said second pump to said third inlet means when said second valve is operated.

25. The control system of claim 24 wherein said valves are solenoid operated spool valves.

26. The control system of claim 12 wherein:

said control means is remotely operated by means of a manually movable lever having a plurality of incremental positions, and said control means includes means for operating said first pump at a low speed and connecting said first pump to one of said fluid lines when said lever is in a first said position, operating said first pump at a high speed and continuing to maintain said first pump connected to said one of said fluid lines when said lever is in a second sequential said position, said operating both said pumps at a high speed and connecting them to said one of said fluid lines when said lever is in a third sequential said position.

27. A fluid control system for a mobile aerial tower including fluid actuated positioning elements comprising:

first valve means for controlling the direction of fluid flow to one of the positioning elements, second valve means for controlling the direction of fluid flow to another of the positioning elements, first and second multiple speed fluid pumps, selectively actuatable means for alternatively: operatively connecting one of said first or second pumps to either of said valve means, operatively connecting both said pumps to either of said valve means, or operatively connecting one of said pumps to one of said valve means and the other of said pumps to the other of said valve means, and selectively actuatable pump control means for alternatively: operating either of said pumps at a high speed or a low speed, operating both of said pumps together at said low speed or said high speed, or operating one of said pumps at said high speed and the other of said pumps at said low speed.

28. A mobile aerial tower comprising:

a plurality of fluid operated bucket positioning elements including first and second interconnected boom means and turntable means connected to one of said boom means for rotating said boom means about an axis, fluid pump means, first and second pump output lines connected to said pump means, means associated with said pump means and said pump output lines for independently controlling the fluid pressures in said first and second output lines, the fluid pressure in said output lines being at a high pressure level or a low pressure level, selectively actuatable valve means for operatively connecting said first and second output lines respectively to any two of said positioning elements or alternatively operatively connecting said first and second output lines simultaneously to any one of said positioning elements or alternatively operatively connecting either of said first or second output lines to any one of said positioning elements.

29. The apparatus of claim 28 wherein said pump means comprises two separate variable speed pumps connected respectively to said output lines.

30. The apparatus of claim 28 wherein said pump means comprises a single pump and wherein said means for independently controlling comprises two independently controlled valves in said first and said second output lines, respectively.

31. An articulated tower comprising:

a turntable rotatable about an upright axis, a reversible hydraulic motor means operatively connected to said turntable for rotating same, a lower boom connected to said turntable for pivotal movement about a horizontal axis, first double-acting hydraulic power cylinder means operatively connected between said turntable and said lower boom for rotating said lower boom about said horizontal axis, an upper boom having one end connected to said lower boom for pivotal movement about a second horizontal axis, second double-acting hydraulic power cylinder means operatively connected between said upper and lower booms for rotating said upper boom about said second axis, first and second variable speed hydraulic pumps, selectively actuatable valve means operatively connected between said pumps and said motor and power cylinder means, control means for selectively and independently controlling the speed at which said pumps operate and for selectively operating said valve means to direct fluid between either said first or said second pump and any one of said motor means and power cylinder means or alternatively between said first and second pumps respectively and any two of said motor means and power cylinder means or alternatively between said first and second pumps collectively and any one of said motor means and power cylinder means.

32. The articulated tower of claim 31 wherein:

said valve means comprises first, second and third selectively actuatable valves having pairs of fluid outlets operatively connected respectively to said upper boom power cylinder means, said motor means and said lower boom power cylinder means, said second valve has a fluid inlet, said first and third valves have fluid inlets operatively connected respectively to said first and second pumps and include means for diverting fluid from said first and second pumps, respectively, to said second valve inlet when said first and third valves, respectively, are not actuated.

33. The articulated tower of claim 32 including a manually operated remote control unit including a handle bidirectionally movable in three directions, three double-acting pneumatic power cylinders and linkage means for coupling the movement of said handle in said three directions, respectively, to actuate said three power cylinders, said control means including means operatively connecting said pneumatic power cylinders to said pumps and said valves whereby actuation of said three pneumatic power cylinders respectively operates said upper boom power cylinder means, said motor means and said lower boom power cylinder means.

34. The articulated tower of claim 33 wherein said handle is movable incrementally through a plurality of successive positions in each of said directions and said means operatively connecting said pneumatic power cylinders correspondingly operates said upper and lower boom power cylinder means and said motor means at successively greater speeds as said handle is incrementally moved.

* * * * *